United States Patent
Bachman et al.

(10) Patent No.: US 12,134,234 B2
(45) Date of Patent: Nov. 5, 2024

(54) WELDABLE THERMOPLASTIC COMPOSITE COMPOSITES

(71) Applicant: Arkema Inc., King of Prussia, PA (US)

(72) Inventors: Nathan J. Bachman, West Chester, PA (US); Robert J. Barsotti, Newtown Square, PA (US)

(73) Assignee: ARKEMA INC., King of Prussia, PA (US)

( * ) Notice: Subject to any disclaimer, the term of this patent is extended or adjusted under 35 U.S.C. 154(b) by 81 days.

(21) Appl. No.: 17/774,954

(22) PCT Filed: Nov. 6, 2020

(86) PCT No.: PCT/US2020/059268
§ 371 (c)(1),
(2) Date: May 6, 2022

(87) PCT Pub. No.: WO2021/092276
PCT Pub. Date: May 14, 2021

(65) Prior Publication Data
US 2022/0379568 A1    Dec. 1, 2022

Related U.S. Application Data

(60) Provisional application No. 62/932,760, filed on Nov. 8, 2019.

(51) Int. Cl.
| | | |
|---|---|---|
| B29C 65/42 | (2006.01) | |
| B32B 7/12 | (2006.01) | |
| B32B 27/08 | (2006.01) | |
| B32B 27/16 | (2006.01) | |
| B32B 27/36 | (2006.01) | |
| B32B 37/14 | (2006.01) | |
| C08L 33/10 | (2006.01) | |

(52) U.S. Cl.
CPC ............. *B29C 65/425* (2013.01); *B32B 7/12* (2013.01); *B32B 27/08* (2013.01); *B32B 27/16* (2013.01); *B32B 27/36* (2013.01); *B32B 37/144* (2013.01); *C08L 33/10* (2013.01); *B32B 2250/03* (2013.01); *B32B 2250/24* (2013.01); *B32B 2307/54* (2013.01); *B32B 2307/558* (2013.01); *B32B 2398/20* (2013.01); *C08L 2203/30* (2013.01)

(58) Field of Classification Search
CPC ....... B29C 65/40; B29C 65/405; B29C 65/42; B29C 65/425; B29C 65/44; B29C 65/46; B32B 27/08; B32B 27/16; B32B 27/308; B32B 27/36
See application file for complete search history.

(56) References Cited

U.S. PATENT DOCUMENTS

| | | |
|---|---|---|
| 2005/0003721 A1 | 1/2005 | Greulich et al. |
| 2006/0292321 A1 | 12/2006 | Chervin |
| 2007/0175573 A1 | 8/2007 | Fox et al. |
| 2009/0208721 A1 | 8/2009 | Tsuchiya et al. |
| 2013/0309465 A1 | 11/2013 | Oda et al. |
| 2016/0284449 A1 | 9/2016 | Haq et al. |
| 2016/0303824 A1 | 10/2016 | Takebe et al. |
| 2017/0165902 A1 | 6/2017 | Matsen et al. |
| 2017/0355150 A1 | 12/2017 | Wang et al. |
| 2018/0178457 A1 | 6/2018 | Grgac et al. |
| 2018/0207882 A1* | 7/2018 | Walter ............... B29C 66/71 |

FOREIGN PATENT DOCUMENTS

| | | |
|---|---|---|
| JP | 2001 049132 A | 2/2001 |
| JP | 2012 232531 A | 11/2012 |
| JP | 2013053316 A * | 3/2013 |
| WO | 2019067654 A1 | 4/2019 |

OTHER PUBLICATIONS

Machine translation of JP 2013-053316 (Year: 2013).*
International Search Report (PCT/ISA/210) and Written Opinion (PCT/ISA/237) mailed on Feb. 4, 2021, by the U.S. Patent and Trademark Office as the International Searching Authority for International Application No. PCT/US2020/059268.

* cited by examiner

*Primary Examiner* — Zachary M Davis
(74) *Attorney, Agent, or Firm* — Buchanan Ingersoll & Rooney PC

(57) ABSTRACT

The invention relates to the use of a low Tg compatible resin as an adhesive layer for the welding of a thermoplastic composite structure to a thermoplastic or thermoset structure. The invention is especially good for the welding of large parts, such as wind turbine halves and spar caps. A useful thermoplastic composite is one formed by the infusion and curing of long fibers by a reactive acrylic liquid resin system, such as ELIUM® resin systems from Arkema.

7 Claims, No Drawings

WELDABLE THERMOPLASTIC COMPOSITE COMPOSITES

FIELD OF THE INVENTION

The invention relates to the use of a low Tg compatible resin as an adhesive layer for welding thermoplastic composite parts or thermoset composite parts to other thermoplastic or thermoset parts, or to a metallic part. The invention is particularly useful in welding thermoplastic composite parts to other thermoplastic parts—especially for very large parts, such as wind turbine blade sections.

BACKGROUND OF THE INVENTION

Mechanical or structured parts that have to absorb high stresses during their use are widely manufactured from composite materials. A composite material is a macroscopic combination of two or more materials. Typically, a composite material comprises a matrix material that forms a continuous phase for the cohesion of the structure, and a reinforcing material with various architectures for the mechanical properties.

Composite materials are widely used in several industrial sectors; for example, building, automotive, aerospace, transport, leisure, electronics, and sports. Composite materials are often considered to provide better mechanical performance (e.g., higher tensile strength, higher tensile modulus, higher fracture toughness, etc.) in comparison to homogenous materials with lower density.

On the commercial industrial scale, the most important class of composites by volume are composites with organic matrices, wherein the matrix material is a polymer. The principal matrix or continuous phase of a polymeric composite material is typically either a thermoplastic polymer or a thermosetting polymer. In a typical example of producing a polymeric composite material, a prepolymer is typically mixed with another component, such as glass beads or fibers, which become wetted or impregnated with the prepolymer, and the composition is subsequently cured.

Thermoset polymer matrices are rigid. Thermoplastic polymers can soften or become less viscous when heated, and can take on new shapes by the application of heat and/or pressure.

Often a composite article is manufactured in two or more parts or structures that must be combined together to form the final article. For example, a hollow wind blade is formed by first forming the upper and lower portions of the wind blade, plus a spar cap that goes between the top and bottom pieces to provide mechanical stability and strength. These structures are then adhered together at their respective interfaces to form a strong, final article. Currently most adhesion of composite pieces is done using an adhesive. Some welding processes have been used to join thermoset components, such as ultrasonic welding (US 2017/0355150) and resistive implant welding (US 2018/0178457), including the use of smart susceptors (US 2017/0165902).

Problem

There is a desire to adhere large, thermoplastic or thermoset composite materials together, without the use of adhesives—to avoid the use of any dissimilar material in the final article. Currently, large composite pieces are adhered together by adhesives. With large pieces, it is impractical to use an external energy source, or to heat the entire structure just to heat the interface material. Moreover, some welding methods, such as the use of heating plates between the surfaces to be joined, require a step of bringing the pieces together after heating—an almost impossible challenge on very large pieces.

Another problem with composite materials, including thermoplastic and thermoset composites, is that there is generally not enough matrix material available to form a strong weld. This problem is amplified in thick materials, where the surface area tolerances are not as tight, and the gap between pieces uneven, leaving areas of the interface having larger gaps to fill for complete surface coverage.

Extra material may be added as an interlayer for a weld. However, it was found that an interlayer made from just the composite matrix resin is often too brittle to serve as an effective interlayer, and subject to failure.

Solution

It has now been found that a low Tg, thermoplastic polymer composition, compatible with structures to be welded together, can be used as an interlayer in an effective welding process. This is especially effective when welding a composite structure to a thermoplastic or thermoset structure, or to a metallic part, and in particular for thermoplastic composite structures.

The compatible, low Tg interlayer thermoplastic composition can be heated and will flow and bond the composite structures. This interlayer and welding process are especially useful in forming wind turbine blades, and other large composite structures.

SUMMARY OF THE INVENTION

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

In a first aspect, the invention relates to an interlayer polymer composition for welding a thermoplastic or thermoset composite structure (1) to a thermoplastic or thermoset structure, or to a metallic part (2), the interlayer comprising a thermoplastic polymer having a Tg of less than 100° C., preferably less than 95° C., preferably less than 90° C., more preferably less than 85° C., and more preferably less than 80° C., less than 75° C., and even less than 70° C.

In a second aspect, the interlayer polymer composition of aspect 1, contains, a (meth)acrylic polymer or copolymers, styrenics, polyvinylidene fluoride, polyolefins, polyvinyl chloride (PVC), polyurethanes (PU) polylactic acid (PLA), acrylonitrile butadiene styrene (ABS), polystyrenics—including high impact polystyrene (HIPS), functionalized polyolefins, vinyl ester, poly(vinyl ester) polyester, and mixtures thereof, and preferably a (meth)acrylic polymer or copolymer.

In a third aspect, the interlayer polymer composition of aspects 1 or 2 may further contain impact modifier at from 1 to 60 weight percent, preferably 10 to 40 weight percent, based on the total interlayer polymer composition.

In a fourth aspect, the interlayer polymer composition of the previous aspects may contain one or more functional polymers, the functionality preferably selected from the group consisting of epoxy, carboxylic acid, anhydride.

In a fifth aspect, a composite structure is presented having in order:
  a) a structure 1, wherein said structure 1 is a thermoplastic composite or thermoset composite,
  b) an interlayer composition comprising a thermoplastic polymer having a Tg of less than 100° C., preferably less than 95° C., preferably less than 90° C., more preferably less than 85° C., and more preferably less than 80° C., less than 70° C., even less than 60° C., 50° C., and 40° C. and
  c) a structure 2, wherein said outer structure is a thermoplastic polymer or thermoset polymer, or a metallic part.

In a sixth aspect, the composite structure of aspect 5, has both structure 1 and structure 2 as thermoplastic composites.

A seventh aspect of the invention relates to a process for welding a composite structure (1) to a thermoplastic or thermoset structure (2) comprising the steps of:
  a) placing a thermoplastic interlayer composition directly between, and in contact with a composite structure (1) and a thermoplastic or thermoset structure, or to a metallic part (2), wherein said interlayer comprises thermoplastic polymer having a Tg of less than 95° C., preferably less than 90° C., more preferably less than 85° C., and more preferably less than 80° C., and
  b) applying energy to said thermoplastic interlayer composition in an effective amount to melt said thermoplastic interlayer composition, and weld structure 1 to structure 2
  c) removing the energy, and allowing the resulting welded article to cool.

In an eighth aspect, the welding process of aspect 7, involves a welding process selected from hot gas welding, hot wedge welding, extrusion welding, hot plate welding, infrared welding, laser welding, spin welding, stir welding, vibration welding, ultrasonic welding, resistance/implant/electrofusion welding, induction welding, dielectric welding and microwave welding.

In a ninth aspect, The welding process of aspects 7 and 8, involves the step of embedding a susceptor within said interlayer composition, prior to placing said interlayer between structure 1 and structure 2.

DETAILED DESCRIPTION OF THE INVENTION

The invention relates to a low Tg interlayer composition used for welding together two or more structures, at least one structure being a composite material, preferably at least one structure being a thermoplastic composite. The invention also relates to a welding process making use of the novel interlayer low Tg composition, and a composite article formed by welding together at least two structures, using the novel interlayer composition, in which at least one structure is a thermoplastic composite structure All references cited herein are incorporated by reference. Unless otherwise stated, all molecular weights are weight average molecular weights as determined by Gas Permeation Chromatography (GPC), and all percentages are percentage by weight.

The term "copolymer" as used herein indicates a polymer composed of two or more different monomer units, including two comonomers, terpolymers, and polymers having 3 or more different monomers. The copolymers may be random or block, may be heterogeneous or homogeneous, and may be synthesized by a batch, semi-batch or continuous process.

By "(meth)acrylic" or "(meth)acrylate" as used herein, denotes both the acrylate and the methacrylate.

The interlayer composition of the invention contains at least one, low Tg thermoplastic polymer resin that is compatible with the structures it is intended to weld together.

By low Tg, as used herein, means the glass transition temperature, as measured at a heating rate of 10° C./minute in DSC in $N_2$, in which the Tg is less than 120° C., 110° C., preferably less than 95° C., preferably less than 90° C., more preferably less than 85° C., and more preferably less than 80° C., preferably less than 75° C., and even less than 70° C., less than 60° C., less than 50° C. and even less than 40° C. The interlayer Tg is less than the matrix polymer Tg of the thermoplastic composite, and preferably at least 15° C. less, and more preferably at least 10° C. less, and even 20° C. less.

"Compatible polymers", as used herein refers to polymers that are immiscible with each other, but as a blend exhibit macroscopically uniform physical properties. The macroscopically uniform properties are generally caused by sufficiently strong interactions between the component polymers.

"Miscible polymers", as used herein refers to two or more polymers that form a homogeneous polymer blend that is a single-phase structure, having a single glass transition temperature.

Useful interlayer polymers for use with thermoplastic composite structures based on acrylates include, but are not limited to (meth)acrylate polymers and copolymers (Available from Arkema), styrenics, polyvinylidene fluoride, polyolefins, polyvinyl chloride (PVC), polyurethanes (PU) polylactic acid (PLA), acrylonitrile butadiene styrene (ABS), polystyrenics—including high impact polystyrene (HIPS), functionalized polyolefins, vinyl esters, poly(vinyl esters), polyester, and mixtures thereof.

Acrylic polymers, as used herein, include but are not limited to, homopolymers, copolymers, and terpolymers comprising alkyl (meth)acrylates monomer units. The alkyl methacrylate monomer is preferably methyl methacrylate, which may make up from 30 to 95 weight percent of the monomer mixture. 5 to 70 percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isopropene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. Styrenic copolymers of the invention have a styrene monomer content of at least 10 percent by weight, preferably at least 25 percent by weight.

One of ordinary skill in the art can select a comonomer ratio to provide the desired low Tg copolymer.

The interlayer polymer matrix may also contain some functional monomer units—which can be used to improve adhesion properties, and provide cross-linking sites. Useful functional groups include, but are not limited to, epoxy, carboxylic acid, carboxylate, amine, siloxane, silicone, urethane, amide, and anhydride groups. It is noted that functional groups generally increase the Tg of the copolymer or terpolymer, so enough low Tg monomer must be included to offset the Tg increasing functional monomers. Low levels of crosslinking may provide better fatigue properties and thermal stability.

The interlayer composition requires a low Tg, both to provide flowability of the interlayer composition between the structures to be welded, and also to increase the ductility of the interlayer—resulting in better adhesion.

The low Tg interlayer composition means the Tg of the entire interlayer composition—including the polymers and additives. One of ordinary skill in the art will recognize that additives, such as plasticizers, made be added to a polymer composition to provide a lower Tg of the composition. Further, since the low Tg is desired to allow the polymer composition to flow into the interface between adjacent polymer structures, the low Tg composition may be a compatible blend of a low Tg polymer, and a higher Tg polymer, such as a blend of polylactic acid and polymethyl methacrylate—available under the RNEW® trademark from Arkema.

Typical additives present in polymer formulations may be added to the interlayer composition at typical effective levels. These additives include, but are not limited to, stabilizers, plasticizers, fillers, antioxidants, antistatic agents, surfactants, colorants, UV stabilizers, and dispersing aids. Some of these additives, such as plasticizers, further help to improve the ductility of the interlayer composition.

Impact modifiers may be present at a level of from 1 to 60 weight percent, preferably 10 to 40 weight percent, based on the total interlayer composition of matrix polymer and all additives. Impact modifiers useful in the invention include, but are not limited to, core-shell particles (both hard and soft core), block copolymers, and graft copolymers. Impact modifiers can increase the ductility of the interlayer, and can improve the performance of the weld.

Core-shell impact modifier, as used herein, is a multi-stage, sequentially-produced polymer having a core/shell particle structure of at least two layers. Preferentially, the core-shell modifier comprises three layers made of a hard core layer, one or more intermediate elastomeric layers, and a hard shell layer. The presence of a hard core layer provides a desirable balance of good impact strength, and high modulus, not achieved with a core/shell modifier that possesses a soft-core layer.

The interlayer is present at a thickness effective to make full contact with the structures being welded together. If the thickness is not great enough, it will not fill the gaps between the structures to be welded. For large parts, the tolerance is a variable range, and the interlayer must be able to fill the whole gap for best adhesion. In general, the interlayer should be between 0.1 and 10 mm thick, preferably 0.2 to 5 mm, and more preferably 0.25 to 3 mm in thickness.

In one embodiment, the interlayer polymer is a liquid acrylic polymer/monomer system, combined with a polymerization initiator, similar to the composition of the matrix prepreg used to form an acrylic thermoplastic composite, as described below, which cures during the welding process.

Structures

By "structures 1 and 2", as used herein is meant a structure directly on either side of the weld formed by the interlayer. The layer of each structure, in contact with the interlayer weld is referred herein as the outer layer. Structures 1 and 2 may be single layer structures or multi-layer structures.

At least one of the structures 1 and 2, and preferably both, are composites. A preferred thermoplastic composite is a fiber-reinforced thermoplastic, such as cured ELIUM® resin system from Arkema. The ELIUM® resin system is one having:
   (a) a polymeric thermoplastic (meth)acrylic matrix, consisting of at least one acrylic copolymer comprising at least 70% by weight of methyl methacrylate monomer units and from 0.3 to 30% by weight of at least one monomer having at least one ethylenic unsaturation that can copolymerize with methyl methacrylate;
   (b) at least 30 weight percent of a fibrous material, based on the total weight of the polymeric composite material as reinforcement, wherein the fibrous material comprises either a fiber with an aspect ratio of the fiber of at least 1000, or the fibrous material has a two dimensional macroscopic structure, and
   c) initiator.

In a preferred embodiment the fibrous material and the polymeric thermoplastic (meth)acrylic matrix were brought into contact by a wetting step of the fibrous material with a liquid syrup comprising the monomers for forming the polymeric thermoplastic (meth)acrylic matrix before polymerization, and where the dynamic viscosity at 25° C. of the liquid syrup is between 10 mPa*s and 10000 mPa*s in a closed opaque mold.

In one preferred embodiment, the welded composite article of the invention involves at least one structure that is a thermoplastic polymer composite. The second structure (2) of the welded article can be a thermoplastic, a thermoset, a thermoplastic composite, a thermoset composite or a metal. The welding process provides a means to attach a structure, such as a spar cap, or an ancillary structure, to a thermoplastic composite structure. Typical thermoset composite matrices include, but are not limited to, epoxies, vinyl esters, and polyurethanes In one preferred embodiment, both the first and second structures (1 and 2) are thermoplastic composites that may be the same polymer chemistry, or different chemistries. The structure 1 and structure 2 chemistries do not need to be compatible with each other, provided that each structure (matrix polymer) is compatible with the interlayer.

A most preferred embodiment involves the welding of two thermoplastic composites of the same, or nearly the same composition, such as in welding top and bottom halves of a wind blade.

Anticipated by the invention, is the use of the interlayer to weld the following structures:
   a. A thermoplastic composite to a thermoplastic composite.
   b. A thermoplastic (non-composite) to a thermoplastic composite.
   c. A thermoplastic composite to a thermoset composite.
   d. A thermoplastic composite to a thermoset non-composite.
   e. A thermoset composite to a thermoplastic composite.
   f. A thermoset composite to a thermoset non-composite.

g. A thermoset composite to a thermoplastic non-composite.
h. A thermoplastic composite to a metal part.
i. A thermoset composite to a metal part.

The matrix polymers of each of the above structures needs to be compatible with the interlayer polymer composition. The compatibility of the matrix polymers of the structures with each other is preferred, but not required.

Welding Process

The interlayer is used to weld together two or more different structures. Several different welding processes may be used, and the choice of the welding process can depend on the size of the structures, the available equipment, and other considerations. Some useful processes include, but are not limited to hot gas welding, hot wedge welding, extrusion welding, hot plate welding, infrared welding, laser welding, spin welding, stir welding, vibration welding, ultrasonic welding, resistance/implant/electrofusion welding, induction welding, dielectric welding and microwave welding. These methods enables one to join thermoplastic acrylic composite materials quickly and provide a bond that meets desired mechanical performance.

In one embodiment, the welding process is a resistance or induction welding process using a susceptor, such as a stainless steel mesh, powered by an external power source, to heat the interlayer and allow it to flow between the structures to be welded. The susceptor may be encapsulated with the interlayer composition prior to inserting between the structures to be welded. The encapsulation may be by coating, or melt lamination, or a layer of interlayer may be placed on either side of the susceptor within the joint. In the case of a reactive liquid resin composition, the susceptor may be infused with the liquid reactive resin composition, and cured to create a single component at the mating interface.

In one embodiment, rubber strips may be placed on the sides of the area to be welded—to reduce flow of interlayer beyond the desired joint.

EXAMPLES

In each of the Examples, the lap shear adhesion test, ASTM D5868—is used.

Example 1: two flat ⅛ inch thick composite sheets were produced by vacuum infusion using the ELIUM® 1880 system and a biax glass fiber. The sheets were sandwiched together with a single layer of 0.5 mm acrylic film, Solarkote® P600 with an HDT of 63° C., in between. The sandwich was placed in a Carver press with a top platen heated to 197° C. and bottom platen heated to 99° C. The platens were closed without pressure being applied. After 1 minute the sandwich was removed from the heated press and transferred to an ambient temperature carver press and 1000 lbs of pressure was applied for 2 minutes. Lap shear testing of the resulting 0.2595 inch thick panel resulted in a 27 MPA stress at break.

Example 2: a hot plate was used to weld lap shear samples. In this case, the same ELIUM® resin system infused composite sheets used in example 1 were placed on a hot plate with the same film in between. The hotplate was heated to 250° C. and a part temperature of 200° C. was recorded. A clamp was used to hold the stack together and apply continuous pressure. The part was heated for 2 minutes and then cooled for 2 minutes while clamped. Lap shear testing resulted in a stress at break of 46 MPA for the 0.217 inch thick sample.

What is claimed is:

1. An interlayer polymer composition for welding a thermoplastic composite structure (1) to a thermoplastic or thermoset structure, or a metal part (2) comprising a thermoplastic polymer having a Tg of less than 120° C., wherein said interlayer polymer composition is compatible with said structures (1) and (2), wherein the interlayer polymer composition has a Tg at least 10° C. less than a Tg of a matrix polymer of the thermoplastic composite structure (1), and wherein said interlayer polymer composition further comprises impact modifiers present at 1 to 60 weight percent, based on the total interlayer polymer composition.

2. The interlayer polymer composition of claim 1, wherein the thermoplastic polymer is selected from the group consisting of a (meth)acrylic polymer or copolymers, styrenics, polyvinylidene fluoride, polyolefins, polyvinyl chloride (PVC), polyurethanes (PU) polylactic acid (PLA), acrylonitrile butadiene styrene (ABS), polystyrenics, high impact polystyrene (HIPS), functionalized polyolefins, vinyl ester, poly(vinyl ester), polyester and mixtures thereof.

3. The interlayer polymer composition of claim 1, wherein said interlayer polymer composition further comprises impact modifiers present at 10 to 40 weight percent, based on the total interlayer polymer composition.

4. The interlayer polymer composition of claim 1, wherein said interlayer polymer composition further comprises one or more functional polymers.

5. The interlayer polymer composition of claim 4, wherein said one or more functional polymers comprise a functional group selected from the group consisting of epoxy, carboxylic acid, anhydride, carboxylate, amine, siloxane, silicone, urethane, and amide.

6. The interlayer polymer composition of claim 1, wherein the thermoplastic polymer comprises a (meth)acrylic polymer or copolymer as a primary matrix polymer.

7. The interlayer polymer composition of claim 1, wherein said composition further comprises one or more additives selected from the group consisting of stabilizers, plasticizers, fillers, antioxidants, antistatic agents, surfactants, colorants, UV stabilizers, and dispersing aids.

* * * * *